United States Patent [19]
Shaw et al.

[11] Patent Number: 5,282,499
[45] Date of Patent: Feb. 1, 1994

[54] REMOTE RESERVOIR FILLER

[75] Inventors: Schuyler S. Shaw, Dayton; Donald E. Schenk, Vandalia, both of Ohio

[73] Assignee: General Motors Corporation, Detroit, Mich.

[21] Appl. No.: 935,801

[22] Filed: Aug. 27, 1992

[51] Int. Cl.$^5$ .............................................. F15B 7/00
[52] U.S. Cl. ...................... 141/285; 141/44; 141/392; 60/583; 220/86.1; 220/86.2
[58] Field of Search .............. 141/44, 285, 392, 312; 220/861, 862; 60/583-586; 188/382

[56] References Cited

U.S. PATENT DOCUMENTS

| | | |
|---|---|---|
| 2,637,513 | 5/1953 | Wallen . |
| 3,216,198 | 11/1965 | Brooks . |
| 4,234,098 | 11/1980 | Miller et al. . |
| 4,506,507 | 3/1985 | Wimbush . |
| 4,811,763 | 3/1989 | Kupske ................. 141/44 |
| 4,987,740 | 1/1991 | Coleman ................ 60/583 |
| 5,020,326 | 6/1991 | Barker et al. ........... 60/586 |
| 5,033,521 | 7/1991 | Martin ................ 141/337 |
| 5,056,570 | 10/1991 | Harris et al. ........... 141/59 |
| 5,083,433 | 1/1992 | Leigh-Monstevens ...... 60/585 |

FOREIGN PATENT DOCUMENTS

| | | | |
|---|---|---|---|
| 407863 | 9/1966 | Switzerland ........ 220/86.2 |
| 0605728 | 5/1978 | U.S.S.R. ............ 220/86.2 |

*Primary Examiner*—Ernest G. Cusick
*Attorney, Agent, or Firm*—Ernest E. Helms

[57] ABSTRACT

An automotive reservoir arrangement is provided which, in a preferred embodiment, includes a reservoir body capable of holding fluid to a first elevation, a vent cap connected with the reservoir body above the first elevation, a conduit connected with the reservoir at a level below the first elevation, a cylinder fluidly connected with the conduit at a second elevation below the first elevation, the cylinder having a flange, a filler tube sealably slidably inserted within the cylinder being spring biased to extend to a third elevation higher than the first elevation, and a cap for sealing the filler tube and the cap engaging with the flange of the cylinder to retain the filler tube at a fourth elevation below the first elevation.

5 Claims, 1 Drawing Sheet

REMOTE RESERVOIR FILLER

FIELD OF THE INVENTION

The field of the present invention is that of an arrangement for reservoirs for automotive vehicles and means of filling thereof.

DISCLOSURE STATEMENT

In order to meet an environmentally mandated goal of greater fuel economy, it is desirable to lower the elevation of the front hood of a vehicle to improve the aerodynamics of the vehicle. The lowering of the hood puts a greater premium for space in the engine compartment and in the passenger compartment directly underneath the dashboard. Presently, one constraint on the location of master cylinders in vehicles is that the master cylinder reservoir be easily accessible from the engine compartment. It would be desirable to provide design freedom by deleting the above-noted constraint.

SUMMARY OF THE INVENTION

The present invention provides an automotive vehicle reservoir which can be located in a portion of the vehicle generally inaccessible and which can also be filled from a remote location at a lower elevation which is more accessible for maintenance purposes.

DETAILED DESCRIPTION OF THE INVENTION

Figure 1:
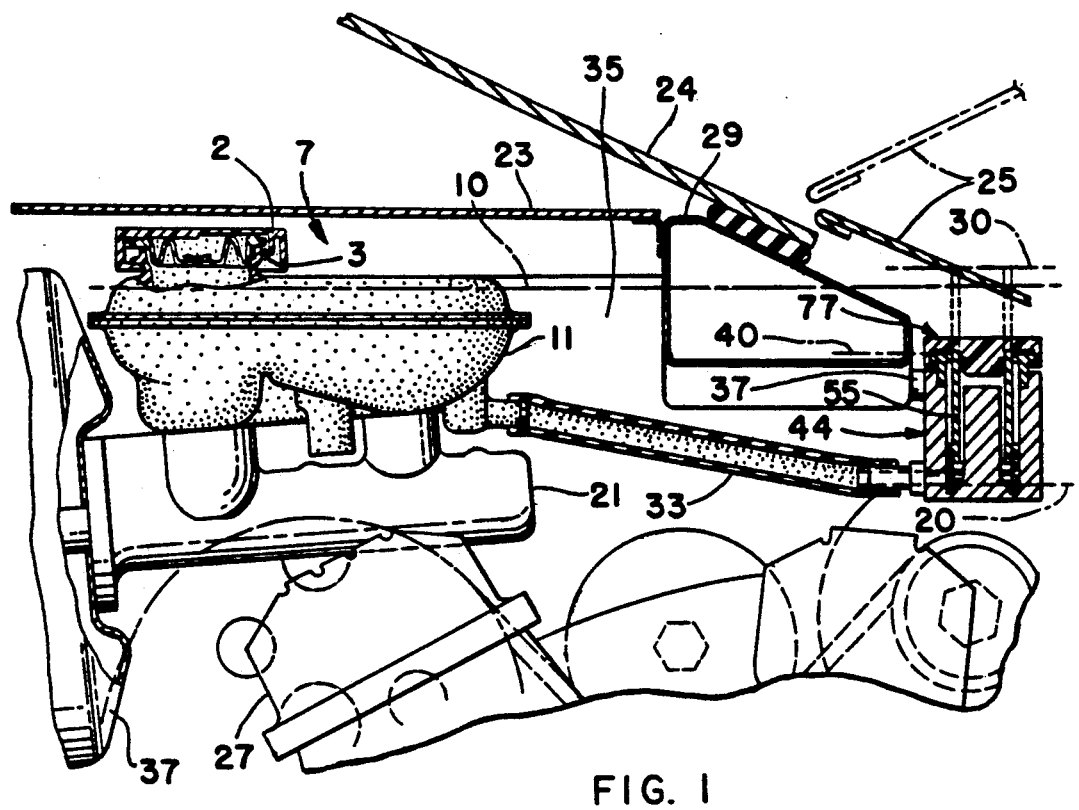
FIG. 1 is a sectional view with portions shown in side elevation of a reservoir arrangement of a preferred embodiment of the present invention.
Figure 2:
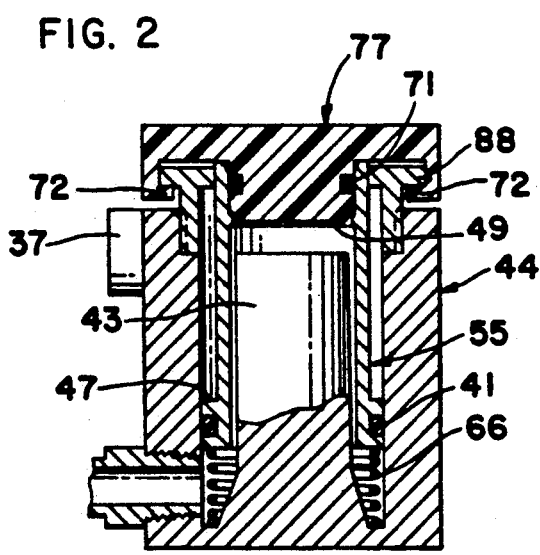
FIG. 2 is an enlarged section of that shown in FIG. 1.
Figure 3:
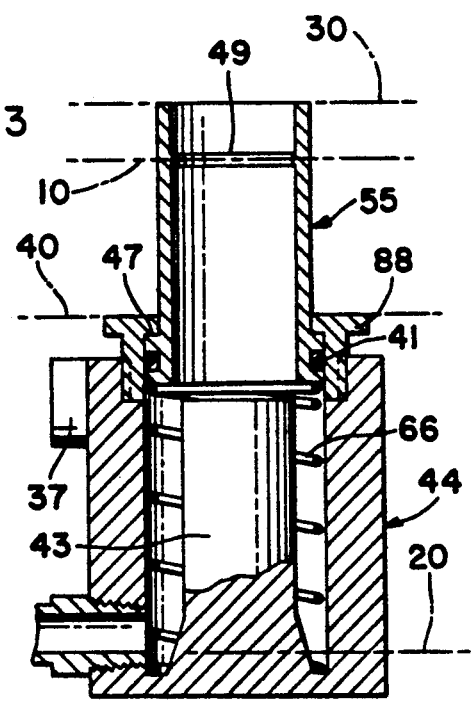
FIG. 3 is a view similar to that of FIG. 2, demonstrating the operation of the filler tube of the reservoir arrangement.

An automotive vehicle has an engine compartment 35 provided with an engine 27. A portion of a top of the engine compartment 35 is defined by a rigid structure 23 which is joined to a transverse structural member 29. The remainder of the engine compartment is provided with an upper border by a removable cover such as a hood 25. Typically, the rigid structure 23 forms a top of the dashboard, which is adjacent to a front windshield 24.

To facilitate stopping the vehicle, there is provided a braking system which includes a master cylinder 21. The master cylinder 21 is connected to a brake booster 37, which is in turn connected with a fire wall of the vehicle (not shown). Positioned on top of the master cylinder 21 is a reservoir body 11. The reservoir body 11 has a cap 2 with a vent 3 typical of those shown and described in Coleman U.S. Pat. 4,987,740, the disclosure of which is incorporated by reference herein. However, other venting master cylinder caps may be utilized.

The reservoir body 11 is located in an area of the engine compartment 35 adjacent to the fixed structure 23, which for practical purposes is generally inaccessible after assembly of the vehicle. The reservoir body 11 may be filled to a first elevation, which is shown by a line 10.

Fluidly connected to the reservoir body 11 is a conduit 33 typically provided by an elastomeric tubular material. The conduit 33 is fluidly connected with a cylinder 44 at a second elevation 20 lower than the first elevation. The cylinder 44 is connected by a boss 37 to the transverse frame member 29. The cylinder 44 extends to a fourth elevation 40 at its top end and has connected thereto a flange 88. The cylinder 44 also optionally has a mounting inner cylinder 43. Slidably mounted in the cylinder 44 and sealed by a sealing member 41 is a filler tube 55. The filler tube 55 is biased by spring 66 to extend from the cylinder 44 to put the top portion of the filler tube at a third elevation 30 which is above the elevation 10. The filler tube is sealed by a cap 77 having a sealing member 71 associated therewith. The cap also has a pair of separate fingers 72 which, by interaction with the flange 88, retain the filler tube 55 at an elevation lower than the first elevation 10.

The method of utilization of the inventive reservoir arrangement 7 is as follows. To fill the reservoir, the cap 77 is removed from the flange 88. This removal may be simply of a snap fit, a bayonet arrangement or a threaded arrangement. Upon removal of the fingers 72 from the flange 88, the spring 66 will push up on the filler tube 55. The filler tube 55 has a step 47 which is captured by an inner portion of the flange 88, allowing the filler tube 55 to extend to the elevation 30. In an embodiment not shown, the spring 66 may be deleted, allowing the filler tube to rise upward solely by being of a lower density material than that of the braking fluid and floating upward; however, it is found to be preferable to provide the spring 66 since it is hard to provide appropriate sealing and still rely upon the flotation force to extend the filler tube 55. Fluid may then be added by a vehicle operator until the fluid reaches indicator line 49, which is placed at the first elevation 10 when the filler tube 55 is extended. After sufficient fluid has been added, the filler cap 77 is again placed upon the filler tube 55, sealing the filler tube 55, and the cap is pushed downward until it re-engages the finger 72 with the flange 88. Thereafter, the vehicle hood 25 may be closed.

While an embodiment of the present invention has been explained, it will be readily apparent to those skilled in the art of the various modifications which may be made to the present invention without departing from the spirit and scope of this application as it is encompassed by the following claims.

The embodiments of the invention in which an exclusive property or privilege is claimed are defined as follows:

1. An automotive reservoir arrangement comprising:
    a reservoir body having an interior capable of holding fluid to a first elevation;
    a vent to expose the interior of the reservoir body to the atmosphere;
    a conduit connected with the reservoir body at a level below the first elevation;
    a cylinder fluidly connected with the conduit, the cylinder being fluidly connected with the conduit at a second elevation below the first elevation;
    a filler tube sealably slidably inserted within the cylinder and extendible therefrom to a third elevation higher than the first elevation;
    means to bias the filler tube to the third elevation;
    a cap for sealing the filler tube; and
    means to retain the filler tube at a fourth elevation below the first elevation.

2. An arrangement as described in claim 1 wherein the means to bias the filler tube to the third elevation comprises a spring.

3. An arrangement as described in claim 1 wherein there is a flange associated with the cylinder and the means to retain the filler tube at the fourth elevation comprises the cap engaging with the flange.

4. An automotive reservoir arrangement comprising:
- a reservoir body having an interior capable of holding fluid to a first elevation;
- a vent cap connected with the reservoir body above the first elevation, exposing the interior of the reservoir body to the atmosphere;
- a conduit connected with the reservoir at a level below the first elevation;
- a cylinder fluidly connected with the conduit at a second elevation below the first elevation, the cylinder having a flange;
- a filler tube sealably slidably inserted within the cylinder and being spring biased to extend to a third elevation higher than the first elevation; and
- a cap for sealing the filler tube and the cap engaging with the flange of the cylinder to retain the filler tube at a fourth elevation below the first elevation.

5. An arrangement of an automotive braking system master cylinder reservoir capable of being located adjacent a fixed structure in the vehicle being generally inaccessible and being filled from a remote location generally adjacent to an area accessible by a removable cover, the reservoir arrangement in combination comprising:
- a reservoir body having an interior capable of holding fluid to a first elevation and having a vented cap;
- a conduit connected with the reservoir body at a level below the first elevation;
- cylinder fluidly connected with the conduit at a second elevation below the first elevation, the cylinder having a flange;
- a filler tube sealably slidably inserted within the cylinder and spring biased to extend therefrom to a third elevation higher than the first elevation; and
- a cap for sealing the filler tube having means of retention with the flange of the cylinder to position the filler tube at a fourth elevation below the first elevation.

* * * * *